(12) United States Patent
Mao et al.

(10) Patent No.: US 11,282,495 B2
(45) Date of Patent: Mar. 22, 2022

(54) SPEECH PROCESSING USING EMBEDDING DATA

(71) Applicant: Amazon Technologies, Inc., Seattle, WA (US)

(72) Inventors: Hongda Mao, Fremont, CA (US); George Yu-Chien Lin, Sunnyvale, CA (US); Sundararajan Srinivasan, Sunnyvale, CA (US); Chu-Cheng Hsieh, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 172 days.

(21) Appl. No.: 16/712,567

(22) Filed: Dec. 12, 2019

(65) Prior Publication Data

US 2021/0183358 A1    Jun. 17, 2021

(51) Int. Cl.
*G10L 13/027* (2013.01)
*G10L 13/00* (2006.01)
*G10L 17/04* (2013.01)
*G10L 17/18* (2013.01)

(52) U.S. Cl.
CPC ............ *G10L 13/027* (2013.01); *G10L 13/00* (2013.01); *G10L 17/04* (2013.01); *G10L 17/18* (2013.01)

(58) Field of Classification Search
USPC .................................. 704/246–250, 258–269
See application file for complete search history.

(56) References Cited

U.S. PATENT DOCUMENTS

| | | | | |
|---|---|---|---|---|
| 7,869,998 B1* | 1/2011 | Di Fabbrizio | .......... | G10L 13/00 |
| | | | | 704/251 |
| 10,140,973 B1* | 11/2018 | Dalmia | ................ | G06F 40/247 |
| 2015/0294670 A1* | 10/2015 | Roblek | .................... | G10L 17/00 |
| | | | | 704/232 |
| 2017/0244834 A1* | 8/2017 | Flores | ................. | H04M 3/4936 |
| 2018/0268806 A1 | 9/2018 | Chun et al. | | |
| 2019/0392842 A1* | 12/2019 | Khoury | .................. | G10L 17/04 |
| 2020/0380980 A1* | 12/2020 | Shum | ...................... | G10L 17/08 |
| 2021/0035551 A1* | 2/2021 | Stanton | .................... | G10L 13/10 |
| 2021/0097427 A1* | 4/2021 | Clark | ...................... | G06N 3/084 |

FOREIGN PATENT DOCUMENTS

| | | |
|---|---|---|
| EP | 3376497 A1 | 9/2018 |
| EP | 3401805 A1 | 11/2018 |

OTHER PUBLICATIONS

Stanton et al. "Predicting Expressive Speaking Style from Text in End-To-End Speech Synthesis". arXiv:1808.01410v1 [cs.CL] Aug. 4, 2018 (Year: 2018).*

Kepesi, International Search Report and Written Opinion issued in International Application No. PCT/US2020/061731, dated Mar. 15, 2021, 10 pages.

* cited by examiner

*Primary Examiner* — Jesse S Pullias
(74) *Attorney, Agent, or Firm* — Pierce Atwood LLP

(57) ABSTRACT

A first neural network model of a user device processes audio data to extract audio embeddings that represent vocal characteristics of a user of an utterance represented in the audio data. The audio embeddings may then be hashed to remove characteristics specific to the user while still maintaining a unique set of characteristics. The hashed embeddings may be sent to a remote system, which may use them to identify the user.

22 Claims, 14 Drawing Sheets

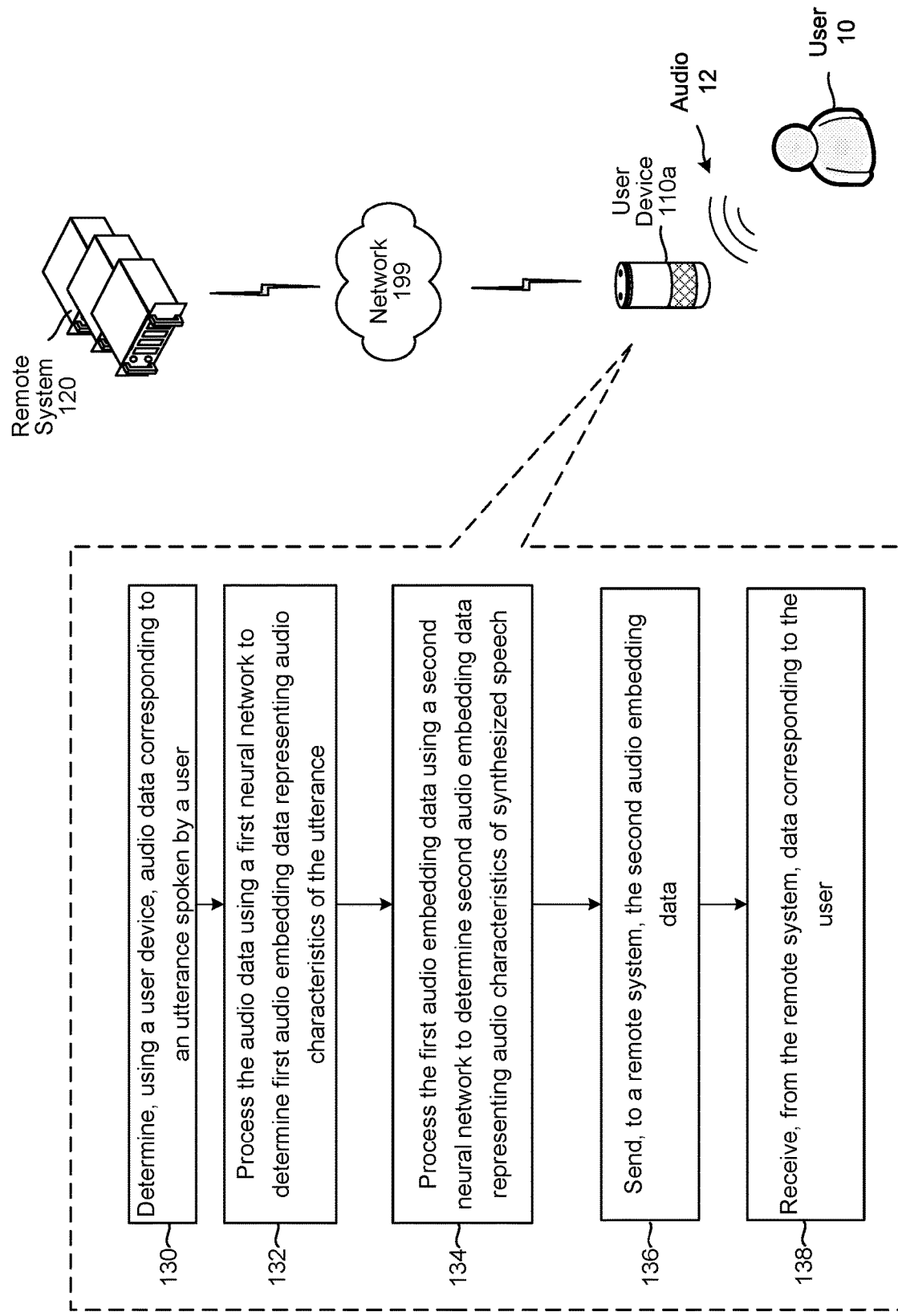

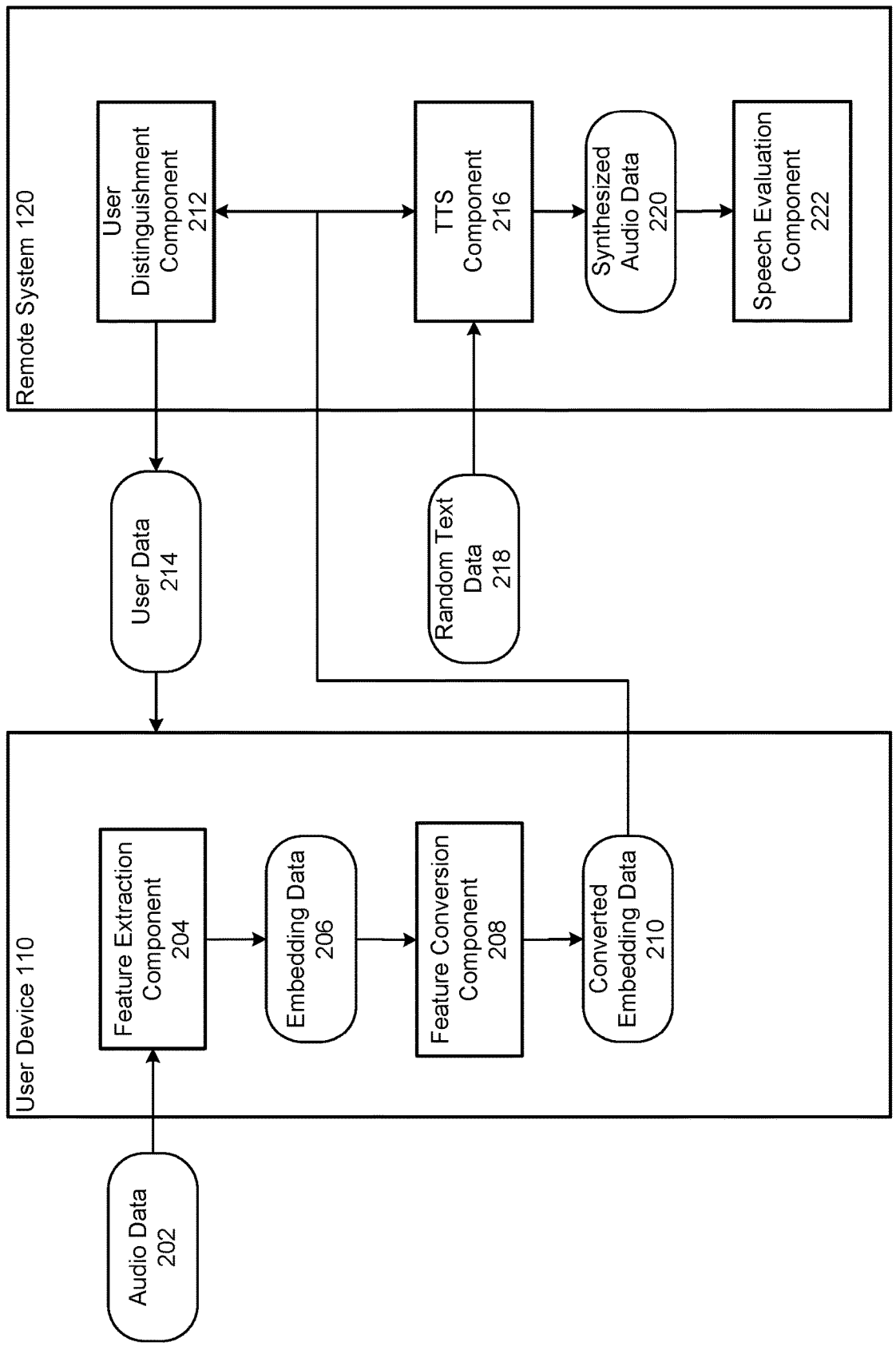

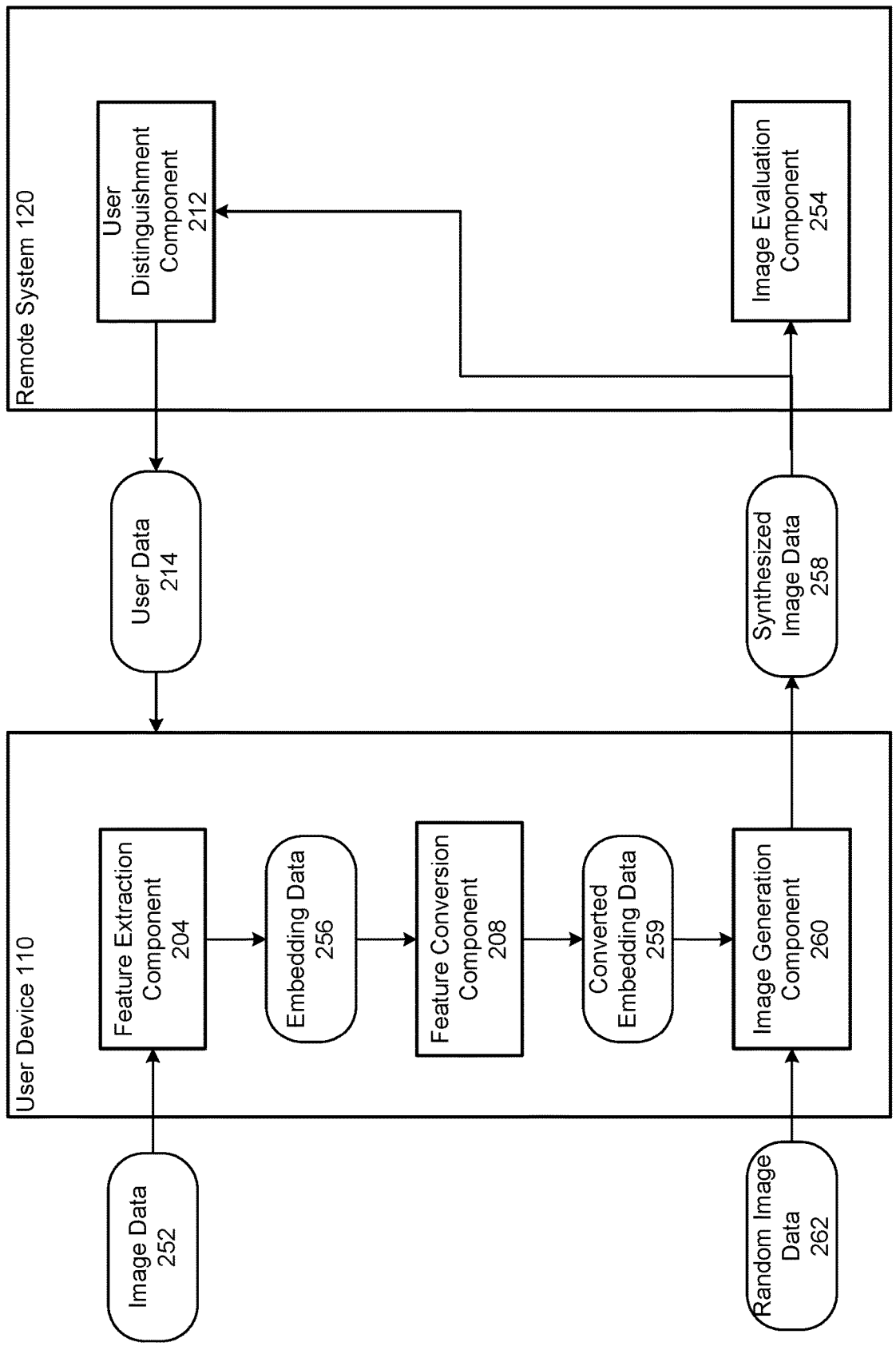

SPEECH PROCESSING USING EMBEDDING DATA

BACKGROUND

A user device may be configured to capture audio and to convert the audio to audio data. The user device may employ speech-processing techniques to process the audio data to perform various operations, such as recognizing speech of a user represented in the audio data and carrying out an action responsive to a command represented in the speech. The user device may instead or in addition send data corresponding to the audio data to a remote system for speech processing.

BRIEF DESCRIPTION OF DRAWINGS

For a more complete understanding of the present disclosure, reference is now made to the following description and the accompanying drawings.

FIGS. 1A and 1B illustrates systems for determining an identifier corresponding to a user according to embodiments of the present disclosure.

FIGS. 2A, 2B, and 2C illustrate systems for determining an identifier corresponding to a user according to embodiments of the present disclosure.

DETAILED DESCRIPTION

Figure 1B:
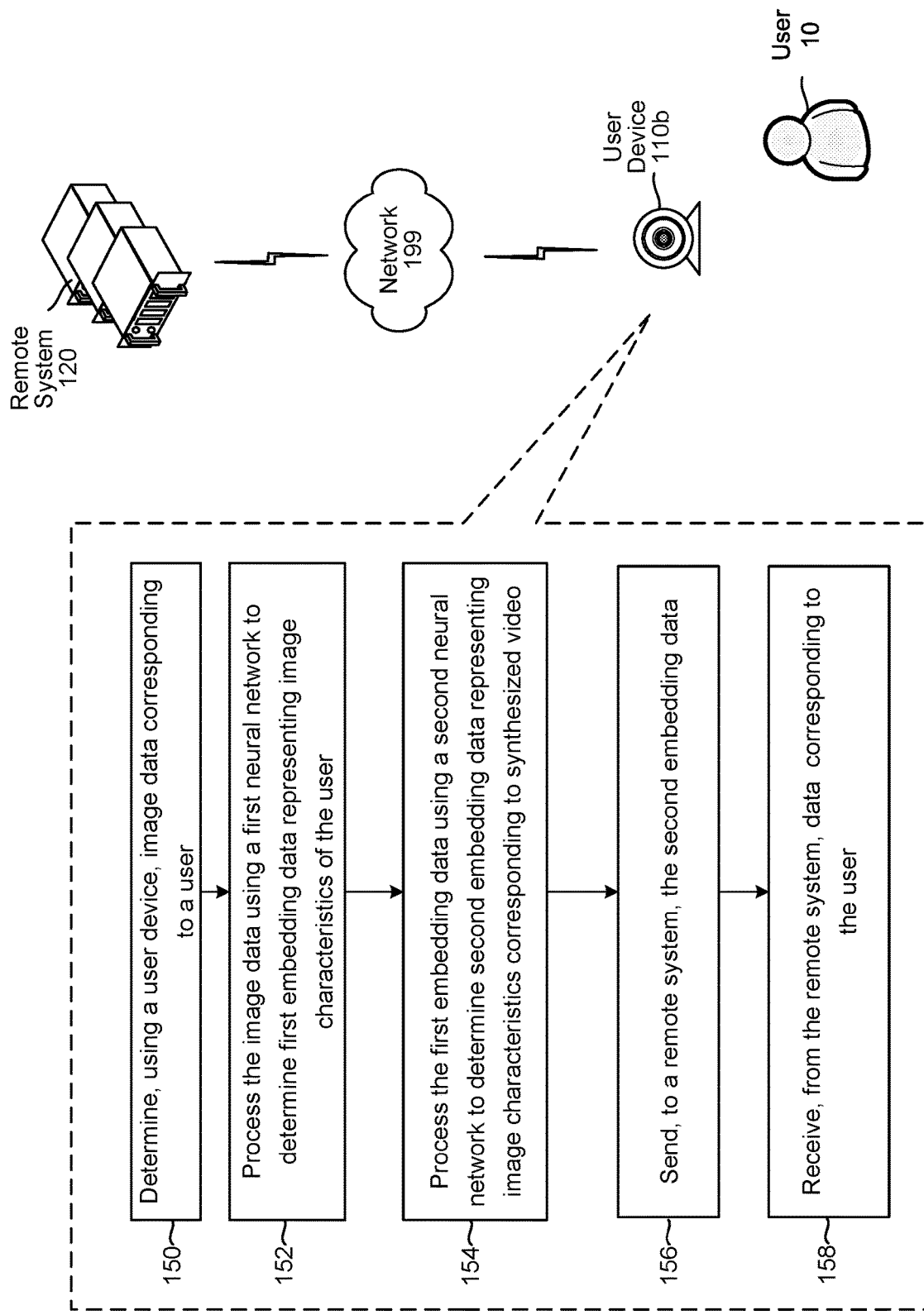

Speech-processing systems allow users to interact with computing devices using their voices. These systems may employ techniques such as automatic-speech recognition (ASR) to recognize words spoken by a user based on the various qualities of received audio and may use natural-language understanding (NLU) to understand the intent of the user given the recognized words. The device may, for example, then perform tasks based on the user's spoken commands. Speech processing may be used by computers, hand-held devices, smart telephones, smart speakers, and a wide variety of other devices to improve human-computer interactions.

In addition to processing audio data with ASR/NLU, the audio data may be processed to determine data corresponding to a user who spoke an utterance represented in the audio data. The "user" may also be referred to as a "user" of a user device. This data may be a name or username associated with the user and/or a user account associated with the user. The data may instead or in addition distinguish between human users without necessarily determining a name, user name, and/or user account associated with the utterance. For example, if a household includes two people named John and Jane Doe, the user data may identify each of them by name, "John Doe" or "Jane Doe," or in a more anonymous manner as, for example, "User A" and "User B."

Once determined, the data corresponding to the user may be used as an input when processing the audio data and/or determining a response to a command represented therein. For example, a history of commands previously received from the user may include preferences corresponding to the user, such as a desired output language, output volume, and/or output speech rate. The data corresponding to the user may also or instead indicate a profile associated with the user, which may include, for example, a list of user contacts. For example, if a user device receives commands from two different users, the command "Call Mom" may have different outputs depending on the user who spoke the utterance.

A user device may be configured to process the audio data and determine a suitable response; a remote device may be configured to determine the data corresponding to the user. The user device may be able to process the audio data more quickly than the remote system due to, for example, a delay in sending the audio data to the remote system and receiving a response. The remote system may, at times, instead or in addition not be reachable over a network (e.g., such as when driving a car with no wireless service available). Further, using the user device to process the audio data avoids sending the audio data over the network, which may increase the security of the speech processing or, even if not increasing actual security, make users feel more comfortable with using the device.

The user device may, however, not be capable of determining the data corresponding to the user because, for example, it may lack computing resources to either determine the data (e.g., there may be a relatively limited number of user identification profiles accommodated by the user device at any given time) and/or determine the data corresponding to the user in an amount of time convenient to the user (e.g., during the utterance). The user device may therefore send data corresponding to the utterance to the remote system, which may then send back data corresponding to the user.

Sending of the audio data itself, however, may be less preferred by some users versus sending no audio data of the user and/or the user's environment/background noise. This audio data may include user information, such as private phone numbers, bank account numbers, shopping lists, or other such information, that the user who spoke the utterance does not wish to transmit to the remote system, if not necessary. The audio data may further include information about the voice of the user, such as the particular tone, pitch, and/or speech rate of the user.

Embodiments of the present disclosure include processing, using the user device, the audio data to determine data that identifies the user of the utterance sans the user information and/or the voice information. For example, the user device may then send only this data to the remote system, which may determine the identifier corresponding to the user. The user device may then receive this identifier and use it for further speech processing.

FIGS. 1A and 1B illustrate systems for determining data corresponding to a user according to embodiments of the present disclosure. Although the steps of FIGS. 1A and 1B, and other figures below, are discussed in a particular order, unless expressly stated otherwise the order of operations may be changed and still be within the scope of the present disclosure. Further, as illustrated in FIGS. 1A and 1B, the steps may be performed by a combination of one or more user device(s) 110 (which may be a first user device 110*a* and/or a second user device 110*b*) and one or more remote system(s) 120, which may be connected by a network 199.

Referring first to FIG. 1A, in various embodiments, the user device 110*a* determines (130) audio data corresponding to an utterance. The user device may receive audio 12 from a user 10 using, for example, a microphone or array of microphones, and determine a digital representation of the analog audio signal, in which numbers in the audio data represent samples of an amplitude of the analog audio signal over time. The audio data may instead or in addition be processed to determine frequency-domain audio data (using, e.g., a Fourier transform); numbers in this audio data may represent frequencies of the audio data. The audio data may further be divided into frames, as described in greater detail below with reference to FIG. 6.

The user device 110*a* may process (132) the audio data using a first neural network to determine first embedding data representing characteristics of the utterance. This first embedding data may include a data vector that represents vocal characteristics of the voice of the user 10. This embedding data compresses or "embeds" audio characteristics of a particular utterance over time. As described in greater detail below, the embedding data may be a vector of (for example) 100-200 floating-point values that represent an embedding of audio of duration between 0.5-2.0 seconds. The values may each represent one or more audio characteristics such as pitch, tone, speech rate, cadence, or other such characteristics. The audio characteristics may also or instead not directly correspond to such named characteristics and may instead or in addition be determined during training of a neural network (as described in greater detail herein).

The user device 110*a* may then process (134) the first embedding data using a second neural network to determine second embedding data representing audio characteristics of synthesized speech. The second embedding data thus represents a transformation of the speech of the original user 10 to speech unassociated with the original user 10. This transformation may include a one-way or "hash" function that maps the various audio characteristics of the original user to other audio characteristics different from that of the original user. If the hash function processes first embedding data from a first user 10 to determine second embedding data, when that same first user 10 later speaks another utterance, the hash function produces additional embedding data that allows the remote system to determine that the outputs of the hash function indicate that the utterances were spoken by the same user 10.

The user device 110*a* thus sends (136), to the remote system 120, the second embedding data via, for example, the network 199. The remote system 120 may then process the second embedding data (using, for example, the user distinguishment component 212 illustrated in FIGS. 2A and 2B) to determine data corresponding to the user 10 (which may be a name, username, or user account corresponding to the user 10 or simply a label associated with the user 10, such as "User A"). The remote system 120 may thereafter send the data corresponding to the user 10 to the user device 110*a*, which receives (138) the data and may then use the data as an input to further processing, such as NLU processing.

Instead of or in addition to the above-described processing of audio data, a user device 110*b* may process image data corresponding to the user 10. Referring first to FIG. 1B, in various embodiments, the user device 110*a* determines (150) image data corresponding to the user 10. For example, the user device 110*b* may include a camera, such as a digital camera including an image sensor and a lens, that is capable of capturing still or moving images of an environment of the device 110*b*. The user device 110*b* may process the captured images to create image data, which may be stored in a compressed format such as JPEG, PNG, and/or MPEG.

The user device 110*b* may then process (152) the image data using a first neural network to determine first embedding data representing image characteristics of the user 10. This first embedding data may include a data vector that represents visual characteristics of the user 10. This embedding data compresses or "embeds" image characteristics of a particular user 10 over time. The embedding data may be a vector of (for example) 100-200 floating-point values that represent an embedding of images that include the face of the user 10. The values may each represent one or more image characteristics such as facial shape, eye separation distance, hair color, or other such characteristics. The image characteristics may also or instead not directly correspond to such named characteristics and may instead or in addition be determined during training of a neural network.

The user device 110*b* may then process (154) the first embedding data using a second neural network to determine second embedding data representing image characteristics of a synthesized user. The second embedding data thus represents a transformation of the image of the original user 10 to an image of a user unassociated with the original user 10. This transformation may include a one-way or "hash" function that maps the various image characteristics of the user 10 to other audio characteristics different from that of the user 10. If the hash function processes first embedding data from a first user 10 to determine second embedding data, when an image of that same first user 10 is later captured by the camera, the hash function produces additional embedding data that allows the remote system 120 to determine that the outputs of the hash function indicate that the images represent the same user.

The user device 110*b* then sends (156), to the remote system 120, the second embedding data via, for example, the network 199. The remote system 120 may then process the second embedding data (using, for example, the user distinguishment component 212 illustrated in FIGS. 2A, 2B, and 2C) to determine data corresponding to the user 10 (which may be a name, username, or user account corresponding to the user 10 or simply a label associated with the user 10, such as "User A"). The remote system 120 may thereafter send the data corresponding to the user 10 to the user device 110*a*, which receives (138) the data and may then use the data as an input to further processing, such as NLU processing.

Figure 2B:
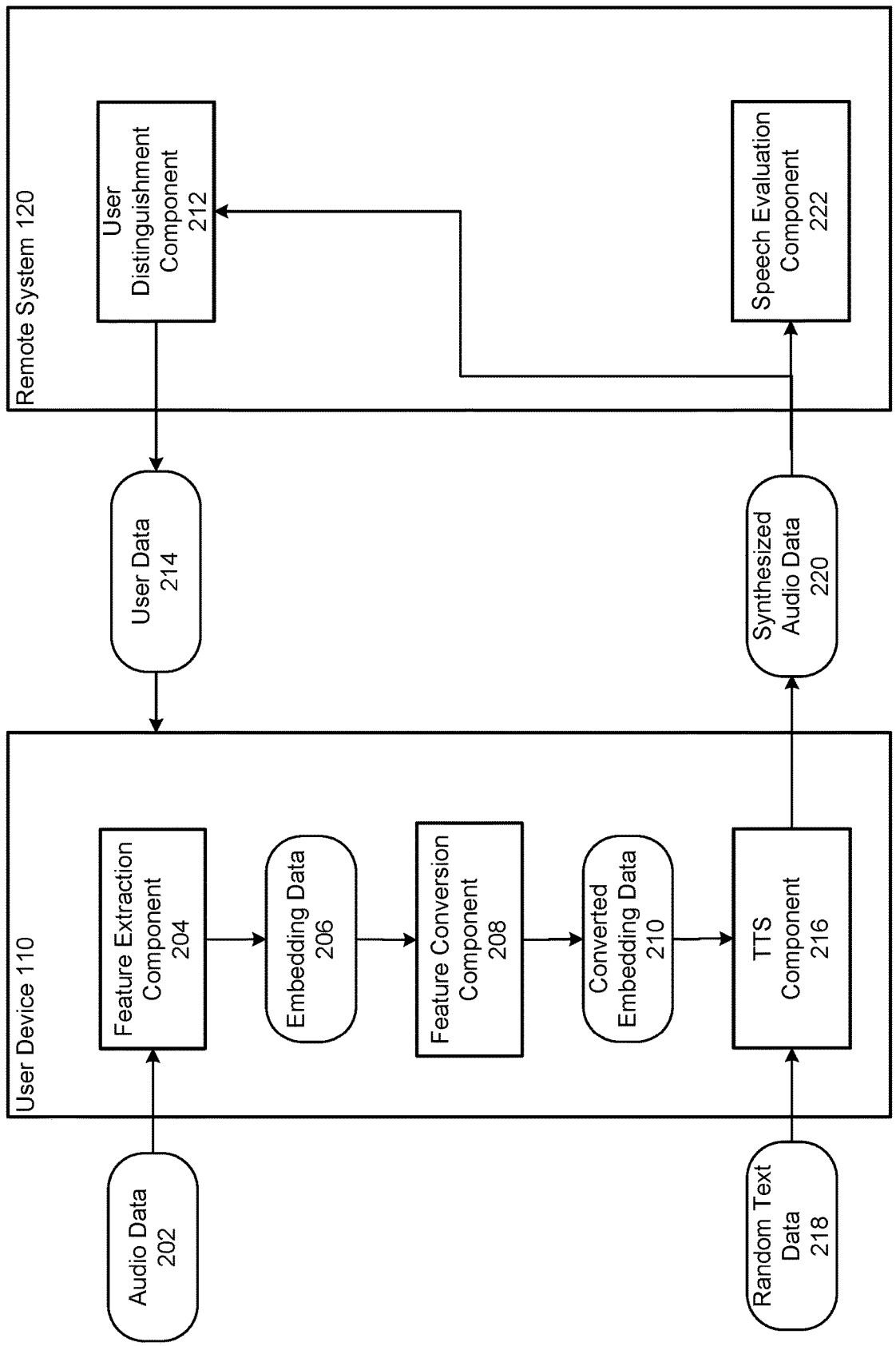
Figure 6:
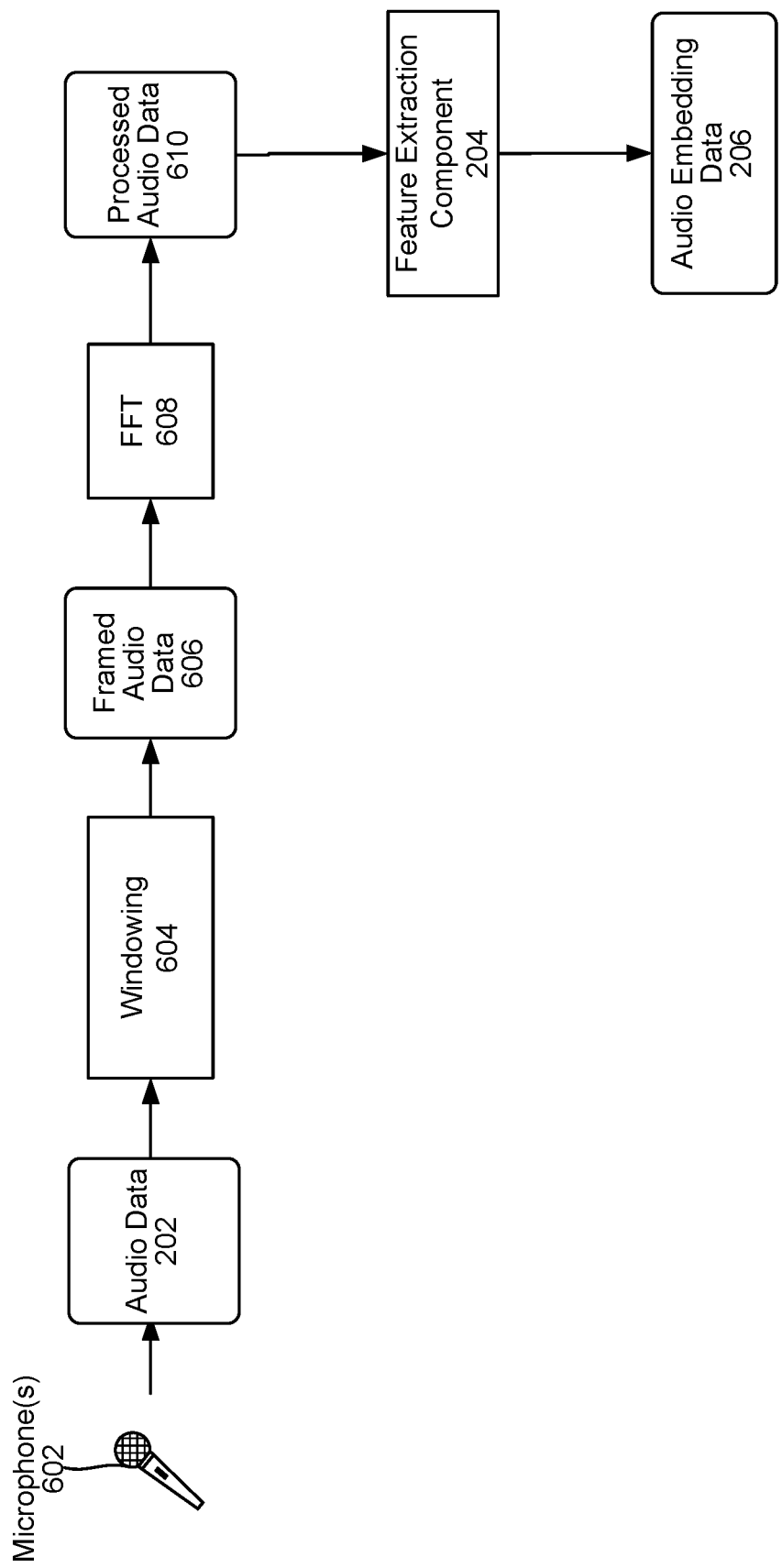
FIG. 6 illustrates a system for processing audio data according to embodiments of the present disclosure.

FIGS. 2A 2B, and 2C illustrate systems for determining a data corresponding to a user according to embodiments of the present disclosure. Referring first to FIG. 2A, a feature extraction component 204 receives audio data 202. Further details of the audio data 202 are shown in FIG. 6. As explained herein, the feature extraction component 204 may include a neural network, such as a deep neural network (DNN), convolutional neural network (CNN), and/or recurrent neural network (RNN). The feature extraction component 204 may be trained to process the audio data 202 and output corresponding embedding data 206, which may be a vector of values representing audio characteristics of the audio data 202. The embedding data 206 may represent a different set of values for different pitches, tones, cadences, accents, etc., associated with the audio data 202. The embedding data 206 may not, however, represent different sets of values for different words represented in the audio data 202. In other words, the feature extraction component 204 extracts features associated with the voice type associated with the audio data 202 but not necessarily the particular words represented in the audio data 202. For example, if the audio data 202 is comprised of a series of frames of audio data, the feature extraction component 204 may process each frame in series in accordance with one or more neural-network weights such that each output 206 of the feature extraction component 204 embeds information from a number of previous frames of audio data.

A feature conversion component 208 may convert the embedding data 206 from a representation of a first set of audio characteristics associated with the user 10 who spoke an utterance represented in the audio data 202 to a second set of audio characteristics associated with a synthesized voice different from that of the user 10. The feature conversion component 208 may thus output corresponding converted embedding data 210. Like the feature extraction component 204, the feature conversion component 208 may be a neural network, such as a DNN, CNN, and/or RNN. The feature conversion component 208 may perform a one-way or hash function using the embedding data 206 as input such that, given just the converted embedding data 210, some or all of the embedding data 206 cannot be reproduced. Thus, if a third party were to intercept the converted embedding data 210, that third party may not be able to reverse engineer any portion of the original, first set of audio characteristics. As explained in greater detail with reference to FIG. 3, the feature conversion component 208 may be trained such that it outputs sufficiently different converted embedding data 210 given embedding data 206 that corresponds to different users. Sufficiently different converted embedding data 210 refers to embedding data that, when processed by the user distinguishment component 212, produces different data for different users.

FIG. 2A illustrates the feature extraction component 204 and the feature conversion component 208 as two separate components, such as two separate neural networks. In other embodiments, however, the feature extraction component 204 and the feature conversion component 208 may be part of the same component, such as part of the same neural network. The feature extraction component 204 may be, for example, a first number of input layers of the neural network, and the feature conversion component 208 may be a second number of output layers of the neural network. The present disclosure is not limited to any particular arrangement of the feature extraction component 204 and the feature conversion component 208.

The user device 110 may send the converted embedding data 210 to the remote system 120 for purposes of determining data corresponding to various users 10. The user distinguishment component 212 may process the converted embedding data 210 to determine corresponding user data 214, which may then be sent back to the user device 110 (which may then use the user data 214 as, for example, an input to NLU processing). Further details of NLU processing, and other speech processing, are described below with reference to FIG. 4. The user distinguishment component 212 may be a neural network, such as a DNN, CNN, and/or RNN), that is trained to output different user data 214 when processing converted embedding data 210 associated with different users. The user distinguishment component 212 may be trained using audio data annotated with the identities of users associated with the audio data.

A TTS component 216 may also process the converted embedding data 210 to determine synthesized audio data 220. The synthesized audio data 220 may correspond to the audio characteristics represented in the converted embedding data 210. The words (and/or non-speech sounds) represented in the synthesized audio data 220 may be determined by selecting random text data 218 from a stored library of candidate text data. Exemplary text data 218 may include such phrases as, "What is the weather like today?" and "What time is it?". The text data 218 may thus include words that do not provide any identification information that indicates the identity of a user of the original utterance. The stored library of candidate text data may include any number of candidate phrases, including a single phrase. The text data 218 may be selected by, for example, generating a random or pseudorandom number and then using that number to index one of the phrases.

A speech evaluation component 222 may then process the synthesized audio data 220 using the determined user data 214 to determine if the user data 214 correctly identified the associated user. The speech evaluation component 222 may use to user data 214 to, for example, determine previously received converted embedding data 210 (and/or previously determined synthesized audio data 220) associated with the user data 214 (which may be, for example, stored in a storage device associated with the remote system 120). The speech evaluation component 222 may then compare the just-received converted embedding data 210 (and/or just-determined synthesized audio data 220) with the previously received data to determine a degree of similarity therebetween. This comparison may be a distance, such as a cosine or Euclidian distance, between values of the data. If the distance is greater than a threshold, the speech evaluation component 222 may determine that the just-determined user data 214 does not correspond to the same user as the previously determined user data. The speech evaluation component 222 may then send, to the user device 110, an indication of this lack of correspondence. As a result, the user device 110 may not use the user data 214 to further process the audio data. In other words, the speech evaluation component 222 makes sure that the synthesized audio data 220 "sounds like" other synthesized audio data previously associated with the user data 214; if it does not, the user device does not use the user data 214.

Referring to FIG. 2B, in various embodiments, the user device 110 determines the synthesized audio data 220 using the TTS component 216 and, instead of or in addition to sending the converted embedding data 210 to the remote system 120, sends the synthesized audio data 220 to the remote system 120. The user distinguishment component 212 then determines the user data 214 by processing the synthesized audio data 220 (instead of or in addition to processing the converted embedding data 210). The user distinguishment component 212 may, for example, recreate the converted embedding data 210 using a feature extraction component, such as the feature extraction component 204 of the user device 110, and then process the converted embedding data 210 as explained above. The speech evaluation component 222 may also process the synthesized audio data 220 as explained above.

In some embodiments, the user device 110 includes the user distinguishment component 212 and itself determines the user data 214. In these embodiments, the user device may send the determined user data 214 and the converted embedding data 210 and/or synthesized audio data 220 to the remote system 120, which may then use the speech evaluation component 222 to determine if the user data 214 correctly identifies the user. If not, the remote system 120 may send a corresponding indication to the user device 110, which may then cease using the user data 214. In some embodiments, the user device 110 may also perform ASR processing to determine text data corresponding to the audio data 202. The user device 110 may thereafter send this text data to the remote system 120 (along with the converted embedding data 210 and/or synthesized audio data 220). The user device 110 may, prior to sending the text data, process the text data to remove user-specific information, such as names or places, from the text data and/or substitute other words in place of the user-specific information.

FIG. 2C illustrates a user device 110 and remote system 120 in accordance with additional embodiments of the present invention. In these embodiments, the user device 110 processes image data 252 in a matter similar to the processing of the audio data 202, as described above, to replace a representation, in the image data 252, of a face (and/or other body part) of the user 10 with a synthesized image of another face (and/or other body part). The synthesized image of the face may, in a series of images defining a video of the user 10, move in sync with the image of the user 10. This movement may be, for example, a head turning, nodding, or shaking or lips moving in sync with an utterance.

The feature extraction component 204 may thus process the image data 252 to determine embedding data 256, which, like the embedding 206 described above, includes a number of values that denote features of the image data 252. These features may be or include physical characteristics of the face, such as skin tone, head shape, and/or hair color, as well as characteristics related to placement or motion of the face, such as whether it is nodding or speaking.

The feature conversion component 208 may then process the embedding data 206 to determine converted embedding data 210. As descried above, the converted embedding data 210 may include features that do not correspond to the face and instead correspond to a different, synthesized face. The feature conversion component 208 may create a first set of similar converted embedding data 210 every time the image data 252 includes a representation of a first face, a second set of similar converted embedding data 210 every time the image data 252 includes a representation of a second face, and so on.

An image generation component 260 may then create synthesized image data 258 using the converted embedding data. The image generation component may be a neural network trained to add features corresponding to the converted embedding data using, in some embodiments, random image data 262. The random image data 262 may include one or more representations of faces, such as a neural or average face, to which the features may be added. The user device 120 may then send the synthesized image data 258 to the remote system 120. As in FIG. 2A, however, the image generation component 260 may be disposed on the remote system 120; in these embodiments, the user device 120 sends the converted embedding data 259 to the remote system. The user distinguishment component may analyze the converted embedding data 259 and/or the synthesized image data 258 to determine user data 214 corresponding to the face of the user.

Figure 3:
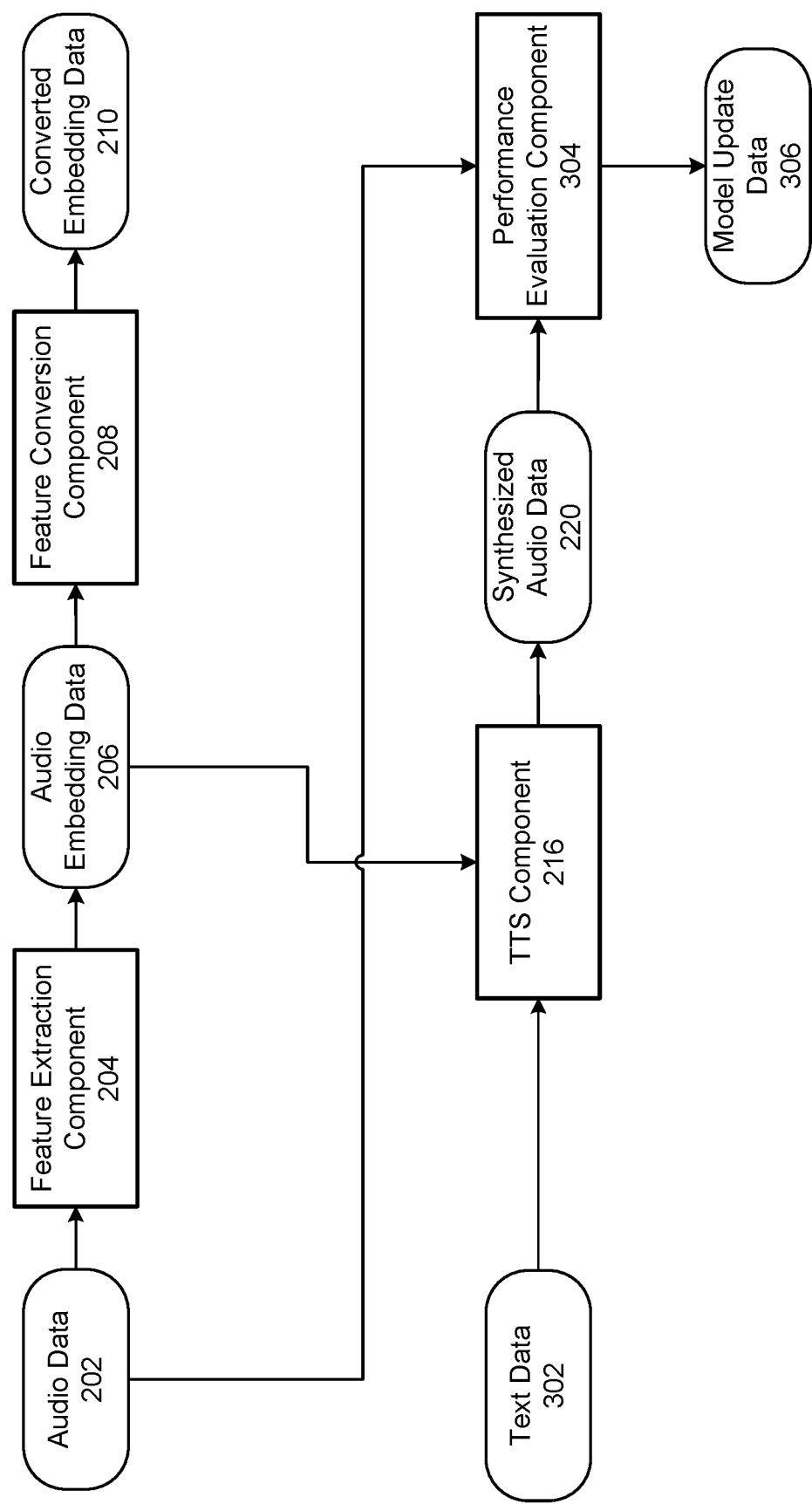
FIG. 3 illustrates a system for training a neural network according to embodiments of the present disclosure.

FIG. 3 illustrates how the various components described above, such as the feature extraction component 204 and the feature conversion component 208, may be trained on the user device 110. The feature extraction component 204 may process audio data 202 to determine embedding data 206, and the feature conversion component 208 may process the embedding data 206 to determine converted embedding data 210. A TTS component 216 may use the embedding data 206 and text data 302 corresponding to the audio data 202 to determine the synthesized audio data 220. That is, unlike the random text data 218 described above with reference to FIGS. 2A and 2B, the text data 302 is a representation of words spoken in the audio data 202. A performance evaluation component 304 determines a degree of similarity between the synthesized audio data 220 and the original audio data 202 using, for example, a loss function such as a mean-square error function or a quadratic loss function. Based on the degree of similarity, the performance evaluation component 304 may determine model update data 306 using, for example, a gradient-descent function, which may include one or more updated weights or other parameters for one or more of the feature extraction component 204, feature conversion component 208, and/or TTS component 216.

Each of the feature extraction component 204, feature conversion component 208, and/or TTS component 216 may be initially trained by a system other than the user device 110, such as the remote system 120, using a corpus of training data including, for example, audio data representing one or more users uttering one or more words (and corresponding annotation data including text representations of those words). The initially trained model may then be transmitted or otherwise installed on the user device 110.

In some embodiments, different portions of the feature extraction component 204, feature conversion component 208, and/or TTS component 216 are trained at different times. For example, initial training may include holding the values of the weights corresponding to nodes of the feature conversion component 208 may be held constant while the feature extraction component 204 and TTS component 216 are trained to maximize a similarity between the audio data 202 and the synthesized audio data 220. Thereafter, the values of the weights of the feature extraction component 204 and TTS component 216 may be held constant while the feature conversion component 208 is trained to minimize that similarity. In other embodiments, only the feature extraction component 204 and feature conversion component 208 are trained (e.g., the TTS component 216 is not trained).

The user device 110 may further train one of the feature extraction component 204, feature conversion component 208, and/or TTS component 216 in accordance with audio data 202 corresponding to a user 10. The user device 110 may, for example, output a prompt for a user 10 to speak one or more words one or more times and determine corresponding audio data 202 in a process that may be referred to as enrollment. As described above, the user device 110 may use this audio data 202 as training data to train the feature extraction component 204, feature conversion component 208, and/or TTS component 216 to generate converted embedding data 210 (and/or corresponding synthesized audio data 220) that corresponds to audio characteristics of a synthesized voice that is (a) different from that of the audio characteristics of the user 10 and (b) different from that of audio characteristics of other users. If the generated converted embedding data 210 (and/or corresponding synthesized audio data 220) is not sufficiently different, the performance evaluation component 304 may determine model update data 306 that includes one or more updated model weights for the feature extraction component 204, feature conversion component 208, and/or TTS component 216 that increase this difference.

In some embodiments, the user device 110 may train the feature extraction component 204, feature conversion component 208, and/or TTS component 216 after an event occurs, such as when the user device 110 determines that the audio data 202 includes a representation of a wakeword. The user device 110 may use the representation of the wakeword itself as the audio data 202. The user device 110 may use multiple utterances of the wakeword as the audio data 202. In other embodiments, the user device 110 uses words in common commands, such as "weather" or "music," as the audio data 202.

Whether the audio data 202 represents audio from the enrollment process described above or from other sources, the user device 110 may save the audio data 202 in storage even after training the one or more components described above. The user device 110 may re-used this stored audio data 202 to later re-train the one or more components. For example, the user device 110 may train the components in accordance with a first user 10, but may later (e.g., days or weeks later) attempt to train the components in accordance with a second user. Training the components for the second user may be difficult or impossible; for example, the second user may have a voice similar to that of the first user, and the synthesized audio data 220 for the first user may preclude generating synthesized audio data 220 for the second user such that the user distinguishment component 212 can distinguish between them. The user device 110 may thus re-train the components using both audio data 202 gathered from the second user and audio data 202 stored for the first user.

Figure 4:
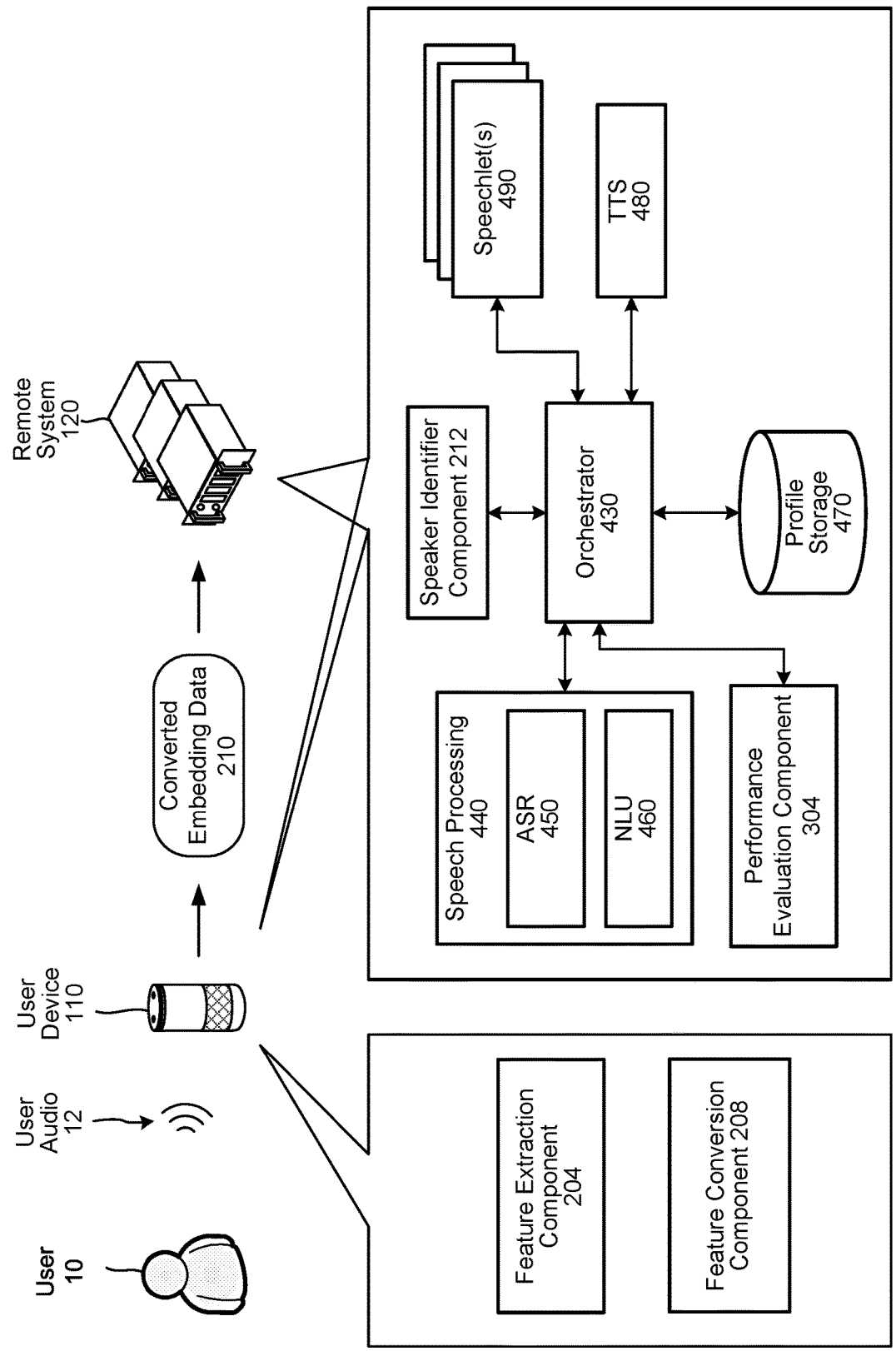
FIG. 4 illustrates a user device and remote system for speech processing according to embodiments of the present disclosure.

Referring to FIG. 4, the user device 110 may receive the input audio 12 and, using an audio capture component such as a microphone or array of microphones, determine corresponding audio data. Before performing wakeword detection as described herein (e.g., activating one or more wakeword-detection components), the device 110 may use various techniques to first determine whether the audio data includes a representation of speech. For example, the device 110 may use a voice-activity detection (VAD) component to determine whether speech is present in the audio data based on various quantitative aspects of the audio data, such as the spectral slope between one or more frames of the first audio data, the energy levels of the first audio data in one or more spectral bands the signal-to-noise ratios of the first audio data in one or more spectral bands and/or other quantitative aspects. In other examples, the VAD component may be a trained classifier configured to distinguish speech from background noise. The classifier may be a linear classifier, support vector machine, and/or decision tree. In still other examples, hidden Markov model (HMM) or Gaussian mixture model (GMM) techniques may be applied to compare the audio data to one or more acoustic models in speech storage; the acoustic models may include models corresponding to speech, noise (e.g., environmental noise or background noise), and/or silence.

The user device 110 may instead or in addition determine that the audio data represents an utterance by using a wakeword-detection component. If the VAD component is being used and it determines the audio data includes speech, the wakeword-detection component may only then activate to process the audio data to determine if a wakeword is likely represented therein. The device 110 may further include an ASR component for determining text data corresponding to speech represented in the input audio 12 and may send this text data to the remote system 120.

The trained models may be CNNs, RNNs, acoustic models, hidden Markov models (HMMs), and/or classifiers. These trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning or smoothing may be applied for decision making. Other techniques for wakeword detection may also be used.

The device 110 may, upon detection of the wakeword and/or voice, then determine the embedding data 206 using the feature-extraction component 204 and the converted embedding data 210 using the feature conversion component 208, as described above. The user distinguishment component 212 may process the converted embedding data 210 (and/or synthesized audio data 220) to determine the identifier 214 corresponding to the user, as also described above, which may be used by the user device 110 to determine an output.

The remote system 120 may be used for additional audio processing after the user device 110 detects the wakeword, begins processing the audio data with ASR and/or NLU, and sends the converted embedding data 210. The remote system 120 may, in some circumstances, receive audio data from the user device 110 (and/or other devices or systems) and perform speech processing thereon. Each of the components illustrated in FIG. 4 may thus be disposed on either the user device 110 or the remote system 120.

The audio data may be sent to, for example, an orchestrator component 430 of either the user device 110 and/or remote system 120. The orchestrator component 430 may include memory and logic that enables the orchestrator component 430 to transmit various pieces and forms of data to various components of the system. The orchestrator component 430 may, for example, send the audio data to a speech-processing component 440. The speech-processing component 440 may include different components for different languages. One or more components may be selected based on determination of one or more languages. A selected ASR component 450 of the speech processing component 440 transcribes the audio data into text data representing one more hypotheses representing speech contained in the audio data 412. The ASR component 450 may interpret the utterance in the audio data based on a similarity between the utterance and pre-established language models. For example, the ASR component 450 may compare the audio data with models for sounds (e.g., subword units, such as phonemes) and sequences of sounds to identify words that match the sequence of sounds spoken in the utterance represented in the audio data. The ASR component 450 sends (either directly or via the orchestrator component 430) the text data generated thereby to a corresponding selected NLU component 460 of the speech processing component 440. The text data output by the ASR component 450 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 460 attempts, based on the selected language, to make a semantic interpretation of the words represented in the text data input thereto. That is, the NLU component 460 determines one or more meanings associated with the words represented in the text data based on individual words represented in the text data. The NLU component 460 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 460 may determine a user intended the system to output the song Africa performed by the band Toto, which the NLU component 460 determines is represented by a "play music" intent. The NLU component 460 may further process the user data 214 to determine the intent and/or output. For example, if the text data corresponds to "play my favorite Toto song," and if the user data 214 corresponds to "User A," the NLU component may determine that the favorite Toto song of User A is "Africa."

The orchestrator component 430 may send NLU results data to a speechlet component 490 associated with the intent. The speechlet component 490 determines output data based on the NLU results data. For example, if the NLU results data includes intent data corresponding to the "play music" intent and tagged text corresponding to "artist: Toto," the orchestrator 430 may send the NLU results data to a music speechlet component, which determines Toto music audio data for output by the system.

The speechlet may be software such as an application. That is, a speechlet may enable the device 110 and/or system 120 to execute specific functionality in order to provide data or produce some other output requested by the user 10. The device 110 and/or system 120 may be configured with more than one speechlet. For example, a weather speechlet may enable the device 110 and/or system 120 to provide weather information, a ride-sharing speechlet may enable the device 110 and/or system 120 to book a trip with respect to a taxi or ride sharing service, and a food-order speechlet may enable the device 110 and/or system 120 to order a pizza with respect to a restaurant's online ordering system.

In some instances, a speechlet 490 may provide output text data responsive to received NLU results data. The device 110 and/or system 120 may include a text-to-speech (TTS) component 480 that generates output audio data from speechlet-provided output text data. The TTS component 480 may use one of a variety of speech-synthesis techniques. In one method of synthesis called unit selection, the TTS component 480 analyzes text data against a database of recorded speech. The TTS component 480 selects units of recorded speech matching the text data and concatenates the units together to form output audio data. In another method of synthesis called parametric synthesis, the TTS component 480 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The device 110 and/or system 120 may include a user distinguishment component 212. As also described above with reference to FIGS. 2A and 2B, the user distinguishment component 212 may receive the converted embedding data 210 output by the feature conversion component 208. The user distinguishment component 212 may determine scores indicating whether the converted embedding data 210 originated from a particular user. For example, a first score may indicate a likelihood that the converted embedding data 210 is associated with a first synthesized voice and a second score may indicate a likelihood that the speech is associated with a second synthesized voice. The user distinguishment component 212 may also determine an overall confidence regarding the accuracy of user recognition operations. The user distinguishment component 212 may perform user recognition by comparing the converted embedding data 210 to stored audio characteristics of other synthesized speech. Output of the user distinguishment component 212 may be used to inform NLU processing as well as processing performed by speechlets 290.

The system 120 may include a profile storage 470. The profile storage 470 may include a variety of information related to individual users and/or groups of users that interact with the device 110. The profile storage 470 may similarly include information related to individual users and/or groups of users that are not necessarily associated with a user account. The profile storage 470 of the user device 110 may include user information, while the profile storage 470 of the remote system 120 may include user information.

The profile storage 470 may include one or more profiles. Each profile may be associated with a different user. A profile may be specific to one user and/or a group of users. For example, a profile may be a "household" profile that encompasses profiles associated with multiple users of a single household. A profile may include preferences shared by all the profiles encompassed thereby. Each profile encompassed under a single profile may include preferences specific to the user associated therewith. That is, each profile may include preferences unique from one or more user profiles encompassed by the same user profile. A profile may be a stand-alone profile or may be encompassed under another user profile. As illustrated, the profile storage 470 is implemented as part of the user device 110 and/or remote system 120. The user profile storage 470 may, however, may be disposed in a different system in communication with the user device 110 and/or system 120, for example over the network 199. Profile data may be used to inform NLU processing as well as processing performed by a speechlet 290.

Each profile may include information indicating various devices, output capabilities of each of the various devices, and/or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user-profile data represents a profile specific to a user.

Figure 5:
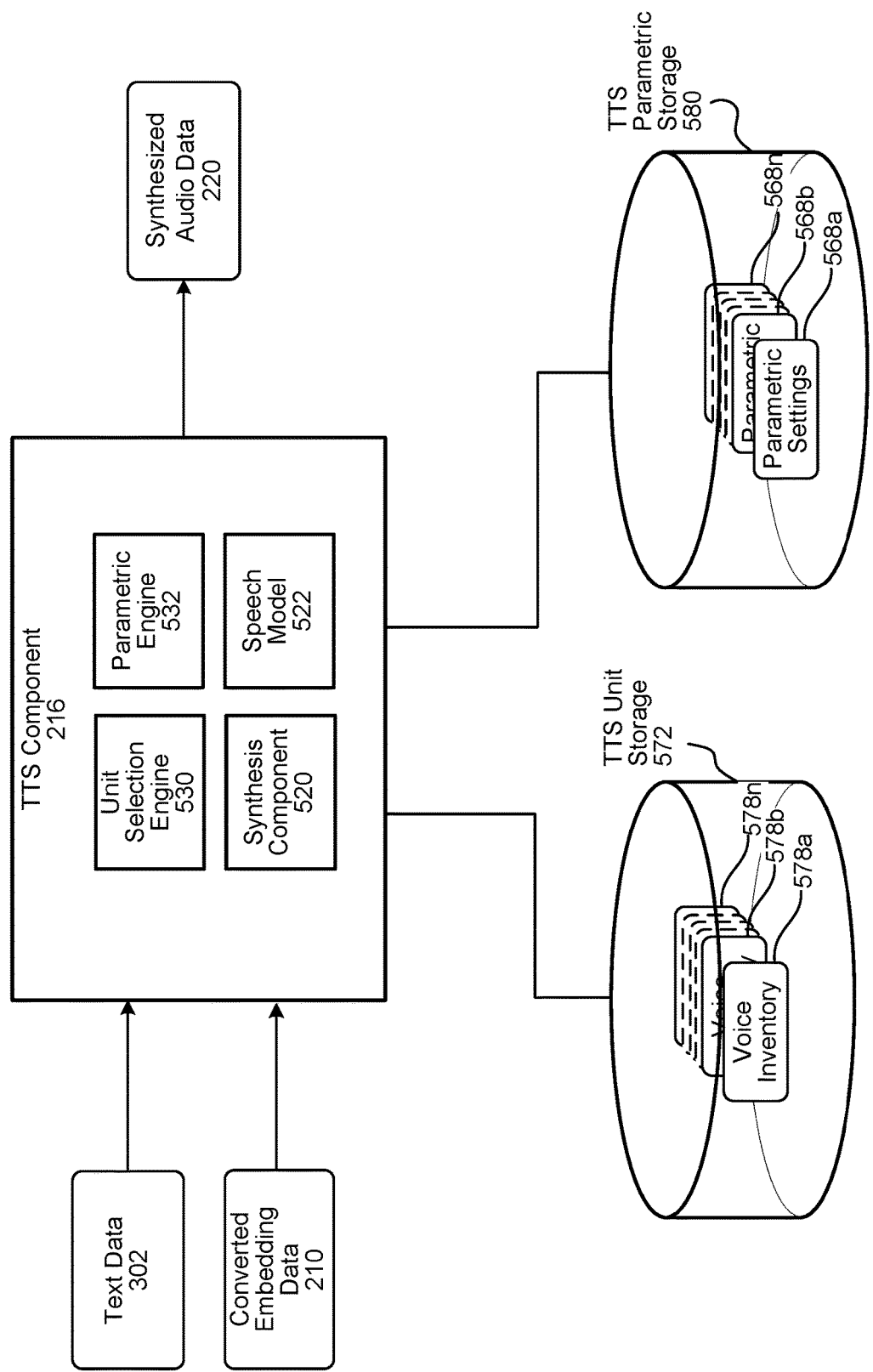
FIG. 5 illustrates a system for text-to-speech synthesis according to embodiments of the present disclosure.

FIG. 5 illustrates components of the TTS component 216 that may be used to perform unit selection, parametric TTS processing, and/or model-based audio synthesis in accordance with the text data 302 and the audio characteristics of the converted embedding data 210. In various embodiments of the present disclosure, synthesis of audio data 220 may be performed using the TTS component 216, which may include a speech model 522, a parametric engine 532, a unit selection engine 530, a synthesis component 520, a TTS front-end, and/or a TTS back end. As shown in FIG. 5, the TTS component 216 may further include a TTS unit storage 572 and a TTS parametric storage 580. The TTS unit storage 572 may include, among other things, voice inventories 578a-578n that may include pre-recorded audio segments (called units) to be used by the unit selection engine 530 when performing unit selection synthesis as described below. The TTS parametric storage 580 may include, among other things, parametric settings 568a-568n that may be used by the parametric synthesis engine 532 when performing parametric synthesis as described below. A particular set of parametric settings 568 may correspond to a particular voice profile (e.g., whispered speech, excited speech, etc.). The speech model 522 may be used to synthesize speech without requiring the TTS unit storage 572 or the TTS parametric storage 580, as described in greater detail below.

The speech model 522 may be trained to directly generate audio output waveforms sample-by-sample. The speech model 522 may be trained to generate audio output that resembles the style, tone, language, or other vocal attribute of a particular user using the converted embedding data 210. The speech model 522 may create tens of thousands of samples per second of audio; in some embodiments, the rate of output audio samples is 16 kilohertz (kHz). The speech model 522 may be fully probabilistic and/or autoregressive; the predictive distribution of each audio sample may be conditioned on all previous audio samples. As explained in further detail below, the speech model 522 may use causal convolutions to predict output audio; in some embodiments, the model uses dilated convolutions to generate an output sample using a greater area of input samples than would otherwise be possible.

The speech model 522 may be trained using a conditioning network that conditions hidden layers of the network using linguistic context features, such as phoneme data. The audio output generated by the model may have higher audio quality than either unit selection and/or parametric synthesis. In various embodiments, the speech model 522 is a sequence-to-sequence ("seq2seq") model that includes an encoder and a decoder. The encoder may include a linguistic encoder that generates encoded linguistic features from the text data; these encoded linguistic features may represent vocal characteristics such as tone, pitch, and cadence. The encoder may further include a paralinguistic encoder that generates encoded paralinguistic features from the text data; these encoded paralinguistic features may represent higher-level characteristics such as emotion, urgency, and mood. A context encoder may generate encoded context data using the encoded linguistic features, encoded paralinguistic features, and voice data. The speech decoder may generate the spectrogram data using the encoded context data. A voice decoder may generate speech-decoder configuration data, which may include one or more weights, using the voice data. The speech decoder may be configured using the generate speech-decoder configuration data by, for example, using the one or more weights.

The encoder and/or decoder may further process some or all of the converted embedding data 210. In various embodiments, the text data 302 indicates which words should be synthesized, but the converted embedding data 210 indicates how those words should be spoken. The converted embedding data 210 may be appended to an output of the encoder; the decoder may thus process both the output of the encoder and the converted embedding data 210.

The unit selection engine 530 may, instead or in addition to using the speech model 522, be used to match the symbolic linguistic representation created by the TTS front end against a database of recorded speech, such as TTS unit storage 572, storing information regarding one or more voice corpuses (e.g., voice inventories 578a-n). Each voice inventory may correspond to various segments of audio that was recorded by a speaking human, such as a voice actor, where the segments are stored in an individual inventory 578 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 530 may then use the information about each unit to select units to be joined together to form the speech output.

The unit selection engine 530 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 520) to form output audio data representing synthesized speech. Using all the information in the unit database, a unit selection engine 530 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

Each voice corpus may include a speech unit database. The speech unit database may be stored in TTS unit storage 572 or in another storage component. For example, different unit selection databases may be stored in TTS unit storage 572. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, user identity, etc. The sample utterances may be used to create mathematical models corresponding to desired audio output for particular speech units. When matching a symbolic linguistic representation, the unit selection engine 530 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. The unit selection engine 530 may select units in a database and/or between databases based at least in part on the converted embedding data 210.

In another method of synthesis called parametric synthesis, parameters such as frequency, volume, noise, are varied by a parametric synthesis engine 532, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 568) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

The parametric synthesis engine 532 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

The TTS front end may transform the input text data 302 (from, for example, an application, user, device, or other text source) into a symbolic linguistic representation, which may include linguistic context features such as phoneme data, punctuation data, and/or syllable-level features. The TTS front end may also process context data, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 302 and/or the text for a TTS request may be accompanied by separate metadata indicating what text should be whispered (or have some other indicated audio characteristic). The TTS component 216 may compare the annotated phonetic units models and information stored in the TTS unit storage 572 and/or TTS parametric storage 580 for converting the input text into speech.

During linguistic analysis, the TTS front end may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 216 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 572. The linguistic analysis performed by the TTS front end may also identify different grammatical components such as prefixes, suffixes, phrases, punctuation, syntactic boundaries, or the like. Such grammatical components may be used by the TTS component 216 to craft a natural-sounding audio waveform output. The language dictionary may also include letter-to-sound rules and other tools that may be used to pronounce previously unidentified words or letter combinations that may be encountered by the TTS component 216 Generally, the more information included in the language dictionary, the higher quality the speech output.

FIG. 6 illustrates processing performed to prepare audio data for further processing. The user device 110 may include an acoustic front end (AFE) (or other such component(s)) that performs various functions on audio data received from a microphone 602 to prepare the audio data 202 for further downstream processing, such as feature extraction by the feature extraction component 204. For example, a windowing component 604 may perform windowing functions on the audio data 202 to create framed audio data 606. The size of each frame may depend upon implementation. In an example, each frame may include twenty-five (25) milliseconds of audio data, with an overlap of the next frame of 10 milliseconds of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. An FFT component 608 may then perform a fast Fourier transform (FFT) that converts the waveforms in each frame of the framed audio data 606 from its original domain (e.g., time) to processed audio data 610, which may be a representation in a frequency domain (thereby creating frequency domain framed audio data 202). Audio processing techniques other than or in addition to FFT may be used to transform audio data (e.g., waveforms) into data that can be processed as needed.

The audio embedding data 206 may include a different audio feature vector for each audio frame. Thus, for one 25 millisecond-long audio frame, the feature extraction component 204 may output a single ASR feature vector. The ASR feature vectors output by the feature extraction component 204 may be output to the feature conversion component 208.

Depending on system configuration, the feature extraction component 204 may output audio embedding data 206 that includes multiple feature vectors, for example one such vector for each audio frame. Alternatively, the feature extraction component 204 may continue to input the audio data 202 while the utterance is ongoing (e.g., before the endpoint of the speech is reached in the audio data 202). While the audio data 202 for the utterance is input, the feature extraction component 204 may accumulate or otherwise combine the audio data 202 as it comes in. That is, for a certain frame's worth of audio data 202 that comes in, the feature extraction component 204 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the feature extraction component 204 may depend on what audio qualities are determined to be important for ultimate user recognition. Thus, the feature extraction component 204 may be trained to isolate and process data that is most useful for user recognition. The output of the user recognition feature extraction component 204 may thus include audio embedding data 206 that includes values for features useful for user recognition. The resulting feature vector data 206 may then be used for user recognition.

The audio embedding data 206 may include multiple vectors, each corresponding to different portions of the utterance. Alternatively, the audio embedding data 206 may be a single vector representing audio qualities of the utterance. The single vector may be created using an encoder that can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. Feature (which may include feature vectors of the audio data 202) may be input into the encoder, which will output audio embedding data that represents the input feature values. The VAD component may be an input into the encoder such that the encoder may only operate when feature values input therein correspond to speech. The individual feature values may correspond to specific audio frames. Regardless of how many feature values are input, any particular encoder will be configured to output vectors of the same size, thus ensuring a continuity of output encoded vector size from any particular encoder (though different encoders may output vectors of different fixed sizes) and enabling comparison of different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori.

The encoder may be implemented as a neural network (NN), recurrent neural network (RNN), GMM, or other model. One particular example is a long short-term memory (LSTM) RNN. There are a variety of ways for the encoder to consume the encoder input, including but not limited to linear, one direction (forward or backward); bi-linear, essentially the concatenation of a forward and a backward embedding; or tree, based on parse-tree of the sequence. In addition, an attention model can be used, which is another RNN or deep neural network (DNN) that learns to "attract" attention to certain parts of the input. The attention model can be used in combination with the above methods of consuming the input. The feature conversion component 208 may include a similar encoder.

The user distinguishment component 212 may also be a trained model, such as a DNN or CNN. In various embodiments, the user distinguishment component 212 is a classifier. The user distinguishment component 212 may be trained to recognize that different sets of converted embedding data (and/or synthesized audio data 220) correspond to different user. This training data may be, for example, items of converted embedding data 210 annotated with user identification information.

Figure 8:
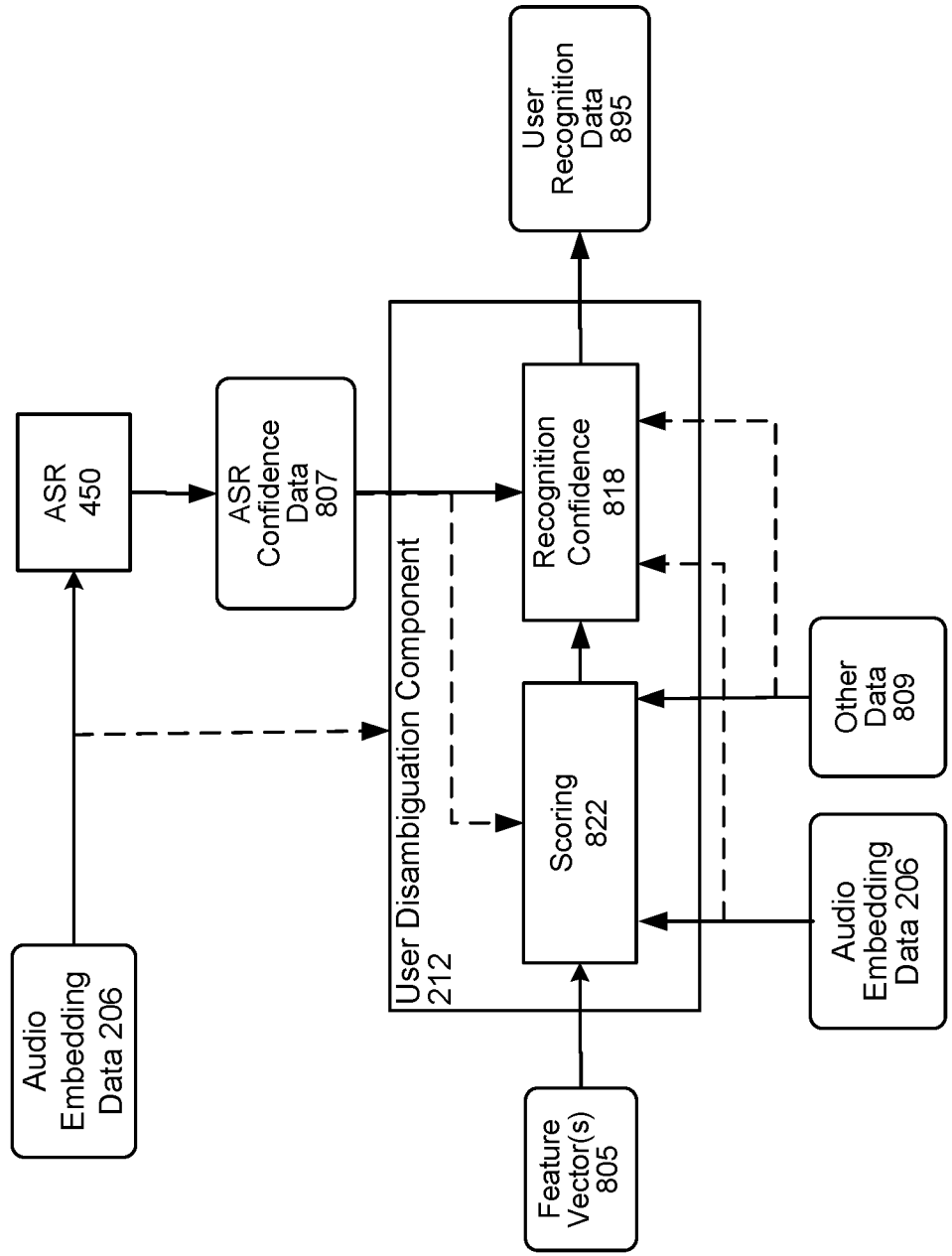
FIG. 8 illustrates a system for user identification according to embodiments of the present disclosure.

The user device 110 may also perform user recognition. FIG. 8 illustrates user recognition as may be performed by the user distinguishment component 212 of the user device 110. The ASR component 450 performs ASR on the audio embedding data 206 (or other embedding data); ASR confidence data 807 may be passed to the user distinguishment component 212.

The user distinguishment component 212 performs user recognition using various data including the audio embedding data 206, feature vectors 805 representing explicit and/or anonymous voice profiles, the ASR confidence data 807, and other data 809. The feature vectors 805 may be, for example, audio embedding data 206 previously determined and associated with the user identifier. The user distinguishment component 212 may then output user recognition confidence data 895, which reflects a certain confidence that the user input was spoken by one or more particular users. The user recognition confidence data 895 may include one or more user identifiers, one or more user profile identifiers, one or more explicit voice profile identifiers, and/or one or more anonymous voice profile identifiers. Each identifier in the user recognition confidence data 895 may be associated with a respective confidence value, representing a likelihood that the user input corresponds to the identifier. A confidence value may be a numeric or binned value.

The user recognition component may attempt to identify the user that spoke the speech represented in the audio data 211 by comparing the audio embedding data 206 to the received feature vector(s) 805. The user distinguishment component 212 may include a scoring component 822 that determines respective scores indicating whether the user input (represented by the audio embedding data 206) was spoken by one or more particular users (represented by the feature vector(s) 805). The user distinguishment component 212 may also include a confidence component 818 that determines an overall accuracy of user recognition operations (such as those of the scoring component 822) and/or an individual confidence value with respect to each user potentially identified by the scoring component 822. The output from the scoring component 822 may include a different confidence value for each received feature vector 805. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 822 and confidence component 818 may be combined into a single component or may be separated into more than two components.

The scoring component 822 and confidence component 818 may implement one or more trained machine learning models (such neural networks, classifiers, etc.) as known in the art. For example, the scoring component 822 may use probabilistic linear discriminant analysis (PLDA) techniques. PLDA scoring determines how likely it is that the audio embedding data 206 corresponds to a particular feature vector 805. The PLDA scoring may generate a confidence value for each feature vector 805 considered and may output a list of confidence values associated with respective user profile identifiers, anonymous voice profile identifiers, and/or explicit voice profile identifiers. The scoring component 822 may also use other techniques, such as GMMs, generative Bayesian models, or the like, to determine confidence values.

The confidence component 818 may input various data including information about the ASR confidence 807, speech length (e.g., number of frames or time of the user input), audio condition/quality data (such as signal-to-interference data or other metric data), fingerprint data, image data, or other factors to consider how confident the user distinguishment component 212 is with regard to the confidence values linking users to the user input. The confidence component 818 may also consider the confidence values and associated identifiers output by the scoring component 822. Thus, the confidence component 818 may determine that a lower ASR confidence 807, or poor audio quality, or other factors, may result in a lower confidence of the user distinguishment component 212. Whereas a higher ASR confidence 807, or better audio quality, or other factors, may result in a higher confidence of the user distinguishment component 212. Precise determination of the confidence may depend on configuration and training of the confidence component 818 and the models implemented thereby. The confidence component 818 may operate using a number of different machine learning models/techniques such as GMM, neural networks, etc. For example, the confidence component 818 may be a classifier configured to map a score output by the scoring component 822 to a confidence value.

The user distinguishment component 212 may output user recognition confidence data 895 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user distinguishment component 212 may output user recognition confidence data 895 with respect to each received feature vector 805. The user recognition confidence data 895 may include numeric confidence values (e.g., 0.0-1.0 or 0-1000). Thus, the user recognition confidence data 895 may output an N-best list of potential users with numeric confidence values. Alternatively or additionally, the user recognition confidence data 895 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user distinguishment component 212 may output an N-best list of potential users with binned confidence value. Combined binned and numeric confidence value outputs are also possible. Rather than a list of identifiers and their respective confidence values, the user recognition confidence data 895 may only include information related to the top scoring identifier as determined by the user distinguishment component 212. The user distinguishment component 212 may also output an overall confidence value that the individual confidence values are correct, where the overall confidence value indicates how confident the user distinguishment component 212 is in the output results. The overall confidence value may be determined by the confidence component 818.

The confidence component 818 may determine differences between individual confidence values when determining the user recognition confidence data 895. For example, if a difference between a first confidence value and a second confidence value is large (and, optionally) the first confidence value is above a threshold confidence value), then the user distinguishment component 212 is able to recognize a first user (associated with the feature vector 805 associated with the first confidence value) as the user that spoke the user input with a much higher confidence than if the difference between the confidence values were smaller.

The user distinguishment component 212 may perform thresholding to avoid incorrect user recognition results being output. For example, the user distinguishment component 212 may compare a confidence value output by the confidence component 818 to a threshold confidence value. If the confidence value does not satisfy (e.g., does not meet or exceed) the threshold confidence, the user distinguishment component 212 may not output user recognition confidence data 895, or may only include in that data 895 an indication that a user speaking the user input could not be recognized. Further, the user distinguishment component 212 may not output user recognition confidence data 895 until enough audio embedding data 206 is accumulated and processed to verify a user above a threshold confidence. Thus, the user distinguishment component 212 may wait until a sufficient threshold quantity of audio data of the user input has been processed before outputting user recognition data 895. The quantity of received audio data may also be considered by the confidence component 818.

Figure 7:
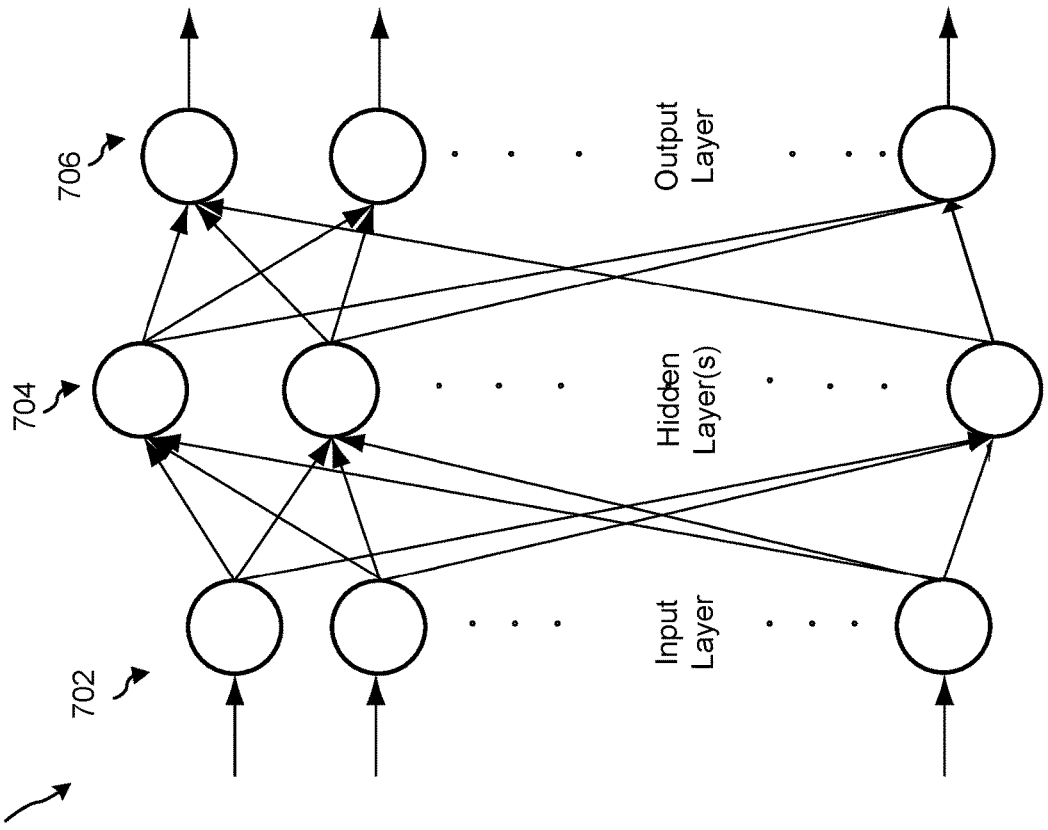
FIG. 7 illustrates a neural network according to embodiments of the present disclosure.

An example neural network, which may be the feature extraction component 204, feature conversion component 208, TTS component 216, and/or user distinguishment component 212, is illustrated in FIG. 7. The neural network may include nodes organized as an input layer 702, one or more hidden layer(s) 704, and an output layer 706. The input layer 702 may include m nodes, the hidden layer(s) 704 n nodes, and the output layer 706 o nodes, where m, n, and o may be any numbers and may represent the same or different numbers of nodes for each layer. Nodes of the input layer 702 may receive inputs (e.g., the audio data 202), and nodes of the output layer 706 may produce outputs (e.g., the audio embedding data 206). Each node of the hidden layer(s) 704 may be connected to one or more nodes in the input layer 702 and one or more nodes in the output layer 704. Although the neural network illustrated in FIG. 7 includes a single hidden layer 704, other neural networks may include multiple hidden layers 704; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

The neural network may also be constructed using recurrent connections such that one or more outputs of the hidden layer(s) 704 of the network feeds back into the hidden layer(s) 704 again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Figure 9:
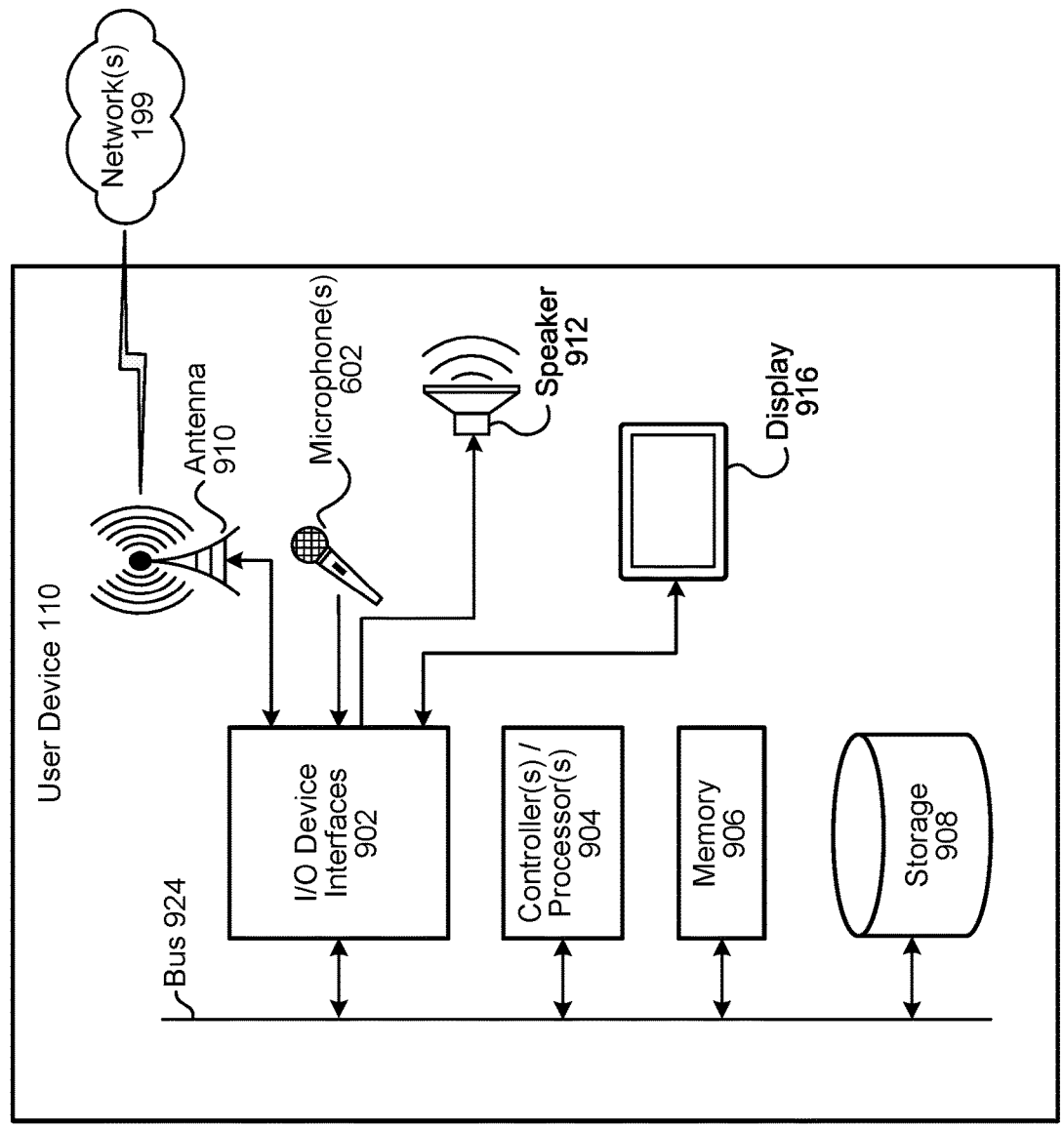
FIG. 9 illustrates example components of a user device according to embodiments of the present disclosure.
Figure 10:
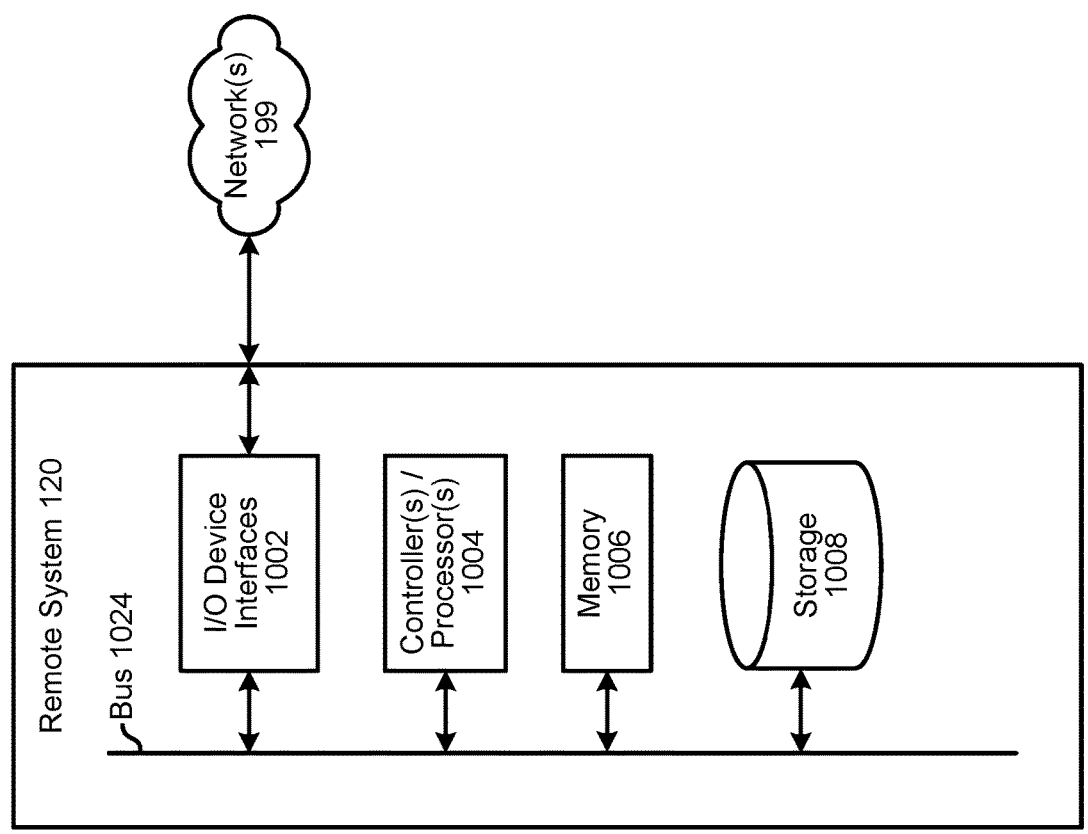
FIG. 10 illustrates example components of a remote system according to embodiments of the present disclosure.

FIG. 9 is a block diagram conceptually illustrating the user device 110. FIG. 10 is a block diagram conceptually illustrating example components of the remote system 120. Either the user device 110, the remote system 120, or some combination thereof may perform the wakeword and/or acoustic event detection as described herein. The remote device 120 may be a server. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple remote systems 120 may be used, such as one or more servers for performing various operations. In operation, each of these devices (or groups of devices) may include computer-readable and computer-executable instructions that reside on the respective device (110/120), as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 1012, a wired headset or a wireless headset, or other component capable of outputting audio. The device 110 may also include an audio capture component. The audio capture component may be, for example, a microphone 602 or array of microphones, a wired headset or a wireless headset (not illustrated), etc. If an array of microphones is included, approximate distance to a sound's point of origin may be determined by audio localization based on time and amplitude differences between sounds captured by different microphones of the array. The device 110 may additionally include a display 916 for displaying content. The device 110 may further include a camera 918. One or more device(s) 110 may capture audio data that may be used for purposes of acoustic event detection as described herein. The audio captured, and resulting audio data, may be used as described herein to detect and locate (for example within the audio data) a representation of an acoustic event.

Via antenna(s) 1014, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the user device 110 or the remote system 120 may include their own dedicated processors, memory, and/or storage. Alternatively, one or more of the components of the device(s) 110 or the remote system 120 may utilize the I/O interfaces (902/1002), processor(s) (904/1004), memory (906/1006), and/or storage (908/1008) of the device(s) 110 or server(s) 120, respectively.

As noted above, multiple devices may be employed in a single system. In such a multi-device system, each of the devices may include different components for performing different aspects of the system's processing. The multiple devices may include overlapping components. The components of the device 110 and the server(s) 120 as described herein, are illustrative, and may be located as a stand-alone device or may be included, in whole or in part, as a component of a larger device or system.

Figure 11:
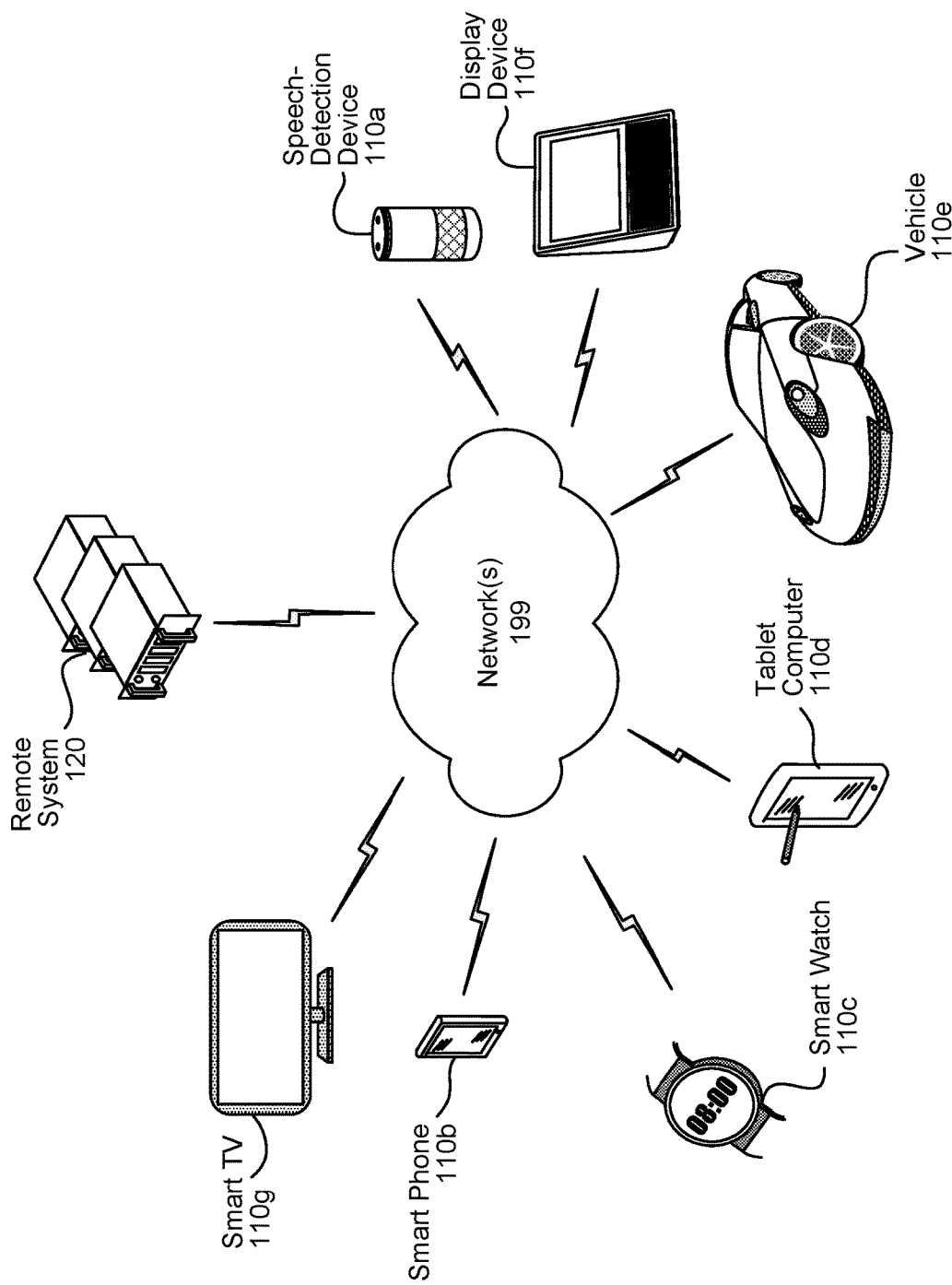
FIG. 11 illustrates an example of a computer network for use with embodiments of the present disclosure.

As illustrated in FIG. 11, multiple devices (110a-110g, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the remote system 120, and/or others. The support devices may connect to the network(s) 199 through a wired connection or wireless connection. Networked devices may capture audio using one-or-more built-in or connected microphones or other audio capture devices, with processing one or more remote systems 120.

The components discussed above may be operated as software, hardware, firmware, or some other combination of computing components. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Users having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    determining, using a user device, first audio data corresponding to an utterance;
    processing, using a feature extraction component, the first audio data to determine first embedding data representing first vocal characteristics of a user who spoke the utterance;
    processing, using a feature conversion component, the first embedding data to determine second embedding data representing second vocal characteristics representing a synthesized voice;
    causing a remote system to determine user identification data corresponding to the user, the user identification data based at least in part on the second embedding data;
    receiving, from the remote system, the user identification data corresponding to the user; and
    processing the first audio data and the user identification data to determine a response to the utterance.

2. The computer-implemented method of claim 1, further comprising:
    outputting, using the user device, a first prompt requesting that the user speak a second utterance;
    determining, using the user device, third audio data corresponding to a first representation of the second utterance;
    outputting, using the user device, a second prompt requesting that the user to speak the second utterance again;
    determining, using the user device, fourth audio data corresponding to a second representation of the second utterance; and
    using the third audio data and the fourth audio data by a text-to-speech (TTS) component.

3. The computer-implemented method of claim 1, further comprising:
    receiving, by the remote system, the second embedding data;
    processing, using a text-to-speech (TTS) component, text data and the second embedding data to determine second audio data corresponding to the text data and the second vocal characteristics;
    selecting, from a storage device associated with the remote system, third audio data associated with the user identification data;
    determining that the third audio data corresponds to the user; and after determining that the third audio data corresponds to the user, sending, to the user device, the user identification data.

4. A computer-implemented method comprising:
   determining, using a user device, audio data corresponding to an utterance;
   processing the audio data to determine first embedding data representing first audio characteristics of the utterance;
   processing the first embedding data to determine second embedding data representing second audio characteristics corresponding to synthesized speech processing;
   causing a remote system to determine data corresponding to a user who spoke the utterance, the data based at least in part on the second embedding data; and
   receiving, from the remote system, the data corresponding to the user who spoke the utterance.

5. The computer-implemented method of claim 4, further comprising:
   determining, using the user device, text data corresponding to the utterance;
   determining, using the text data and the data corresponding to the user, a response to the utterance; and
   causing, using the user device, an output corresponding to the response.

6. The computer-implemented method of claim 4, further comprising:
   selecting stored text data;
   processing, using a text-to-speech neural network, the stored text data and the second embedding data to determine second audio data; and
   sending, to the remote system, the second audio data.

7. The computer-implemented method of claim 4, further comprising:
   prior to processing the audio data, outputting, using the user device, a request to utter a word;
   determining, using the user device, second audio data corresponding to the word; and
   processing the second audio data to train a neural network.

8. The computer-implemented method of claim 4, further comprising:
   processing the second embedding data to determine second audio data corresponding to the second audio characteristics;
   determining third audio data corresponding to the user; and
   determining that the second audio data corresponds to the third audio data.

9. The computer-implemented method of claim 4, further comprising:
   determining, using the user device, image data corresponding to a face of the user;
   processing the image data to determine third embedding data representing first image characteristics of the face;
   processing the third embedding data to determine fourth embedding data representing second image characteristics corresponding to a synthesized face;
   sending, to a remote system, the fourth embedding data; and
   receiving, from the remote system, data corresponding to the user.

10. The computer-implemented method of claim 4, further comprising:
    determining, using the user device, second audio data corresponding to a second utterance;
    processing the second audio data to determine third embedding data representing audio characteristics of the second utterance;
    processing the third embedding data to determine fourth embedding data; and
    determining that the fourth embedding data is associated with the user.

11. The computer-implemented method of claim 10, further comprising:
    sending, to the remote system, the fourth embedding data and an identifier associated with the user; and
    receiving, from the remote system, a third indication that the fourth embedding data is associated with the user.

12. The computer-implemented method of claim 4, further comprising:
    determining, using the user device, text data corresponding to the utterance;
    sending, to the remote system, the text data;
    receiving, from the remote system, output data representing a response to the utterance; and
    causing, using the user device, an output corresponding to the output data.

13. The computer-implemented method of claim 4, wherein the processing of the first embedding data further comprises:
    determining a hash function that maps first audio characteristics corresponding to the user to second audio characteristics different from the first audio characteristics.

14. The computer-implemented method of claim 13, further comprising:
    causing the remote system to determine, based at least in part on the hash function, that a second utterance was spoken by the user.

15. A system comprising:
    at least one processor; and
    at least one memory including instructions that, when executed by the at least one processor, cause the system to:
      determine audio data corresponding to an utterance;
      process the audio data to determine first embedding data representing first audio characteristics of the utterance;
      process the first embedding data to determine second embedding data representing second audio characteristics corresponding to synthesized speech processing;
      cause a remote system to determine data corresponding to a user who spoke the utterance, the data based at least in part on the second embedding data; and
      receive, from the remote system, the data corresponding to the user who spoke the utterance.

16. The system of claim 15, wherein the at least one memory further comprises instructions that, when executed by the at least one processor, further cause the system to:
    determine text data corresponding to the utterance;
    determine, using the text data and the data corresponding to the user, a response to the utterance; and
    causing an output corresponding to the response.

17. The system of claim 15, wherein the at least one memory further comprises instructions that, when executed by the at least one processor, further cause the system to:
    select stored text data;
    process, using a text-to-speech neural network, the stored text data and the second embedding data to determine second audio data; and
    send, to the remote system, the second audio data.

18. The system of claim 15, wherein the at least one memory further comprises instructions that, when executed by the at least one processor, further cause the system to:
  prior to processing the audio data, output a request to utter a word;
  determine second audio data corresponding to the word; and
  process the second audio data to train a neural network.

19. The system of claim 15, wherein the at least one memory further comprises instructions that, when executed by the at least one processor, further cause the system to:
  process the second embedding data to determine second audio data corresponding to the second audio characteristics;
  determine third audio data corresponding to the user; and
  determine that the second audio data corresponds to the third audio data.

20. The system of claim 15, wherein the at least one memory further comprises instructions that, when executed by the at least one processor, further cause the system to:
  determine image data corresponding to a face of the user;
  process the image data to determine third embedding data representing first image characteristics of the face;
  process the third embedding data to determine fourth embedding data representing second image characteristics corresponding to a synthesized face;
  send, to a remote system, the fourth embedding data; and
  receive, from the remote system, data corresponding to the user.

21. The system of claim 15, wherein the at least one memory further comprises instructions that, when executed by the at least one processor, further cause the system to:
  determine second audio data corresponding to a second utterance;
  process the second audio data to determine third embedding data representing audio characteristics of the second utterance;
  process the third embedding data to determine fourth embedding data; and
  determine that the fourth embedding data is associated with the user.

22. The system of claim 21, wherein the at least one memory further comprises instructions that, when executed by the at least one processor, further cause the system to:
  send, to the remote system, the fourth embedding data and an identifier associated with the user; and
  receive, from the remote system, a third indication that the fourth embedding data is associated with the user.

* * * * *